(12) United States Patent
Badding et al.

(10) Patent No.: US 10,211,481 B2
(45) Date of Patent: Feb. 19, 2019

(54) STABILIZED SOLID GARNET ELECTROLYTE AND METHODS THEREOF

(71) Applicant: Corning Incorporated, Corning, NY (US)

(72) Inventors: Michael Edward Badding, Campbell, NY (US); Xinyuan Liu, Painted Post, NY (US); Yanxia Ann Lu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 313 days.

(21) Appl. No.: 14/934,297

(22) Filed: Nov. 6, 2015

(65) Prior Publication Data

US 2016/0149260 A1 May 26, 2016

Related U.S. Application Data

(60) Provisional application No. 62/084,907, filed on Nov. 26, 2014.

(51) Int. Cl.
*H01M 10/0562* (2010.01)
*H01M 10/0525* (2010.01)
(Continued)

(52) U.S. Cl.
CPC ....... *H01M 10/0562* (2013.01); *C04B 35/486* (2013.01); *H01M 4/382* (2013.01); *H01M 4/405* (2013.01); *H01M 4/525* (2013.01); *H01M 4/9016* (2013.01); *H01M 8/08* (2013.01); *H01M 10/0525* (2013.01); *H01M 12/08* (2013.01); *C04B 2235/3203* (2013.01); *C04B 2235/3227* (2013.01); *C04B 2235/3251* (2013.01); *C04B 2235/3286* (2013.01); *C04B 2235/5436* (2013.01); *C04B 2235/5445* (2013.01); *C04B 2235/5472* (2013.01);
(Continued)

(58) Field of Classification Search
CPC ......... H01M 10/0562; H01M 10/0525; H01M 12/08; H01M 8/08; H01M 4/405; H01M 4/9016; H01M 2300/0002; H01M 2300/0071
See application file for complete search history.

(56) References Cited

U.S. PATENT DOCUMENTS 7,901,658 B2   3/2011   Weppner
8,658,317 B2   2/2014   Weppner et al.
(Continued)

OTHER PUBLICATIONS

Franck Gam et al., Reinvestigation of the Total Li+/H+ Ion Exchange on the Garnet-Type Li5La3Nb2O12, Inorganic Chemistry, 53 (2), Jan. 7, 2014, pp. 931-934 (Year: 2014).*
(Continued)

*Primary Examiner* — Osei K Amponsah
(74) *Attorney, Agent, or Firm* — Shanfanu C. Pathak

(57) ABSTRACT

An air stable solid garnet composition, comprising:
a bulk composition and a surface protonated composition on at least a portion of the bulk composition as defined herein, and the protonated surface composition is present on at least a portion of the exterior surface of the bulk composition at a thickness of from 0.1 to 10,000 nm. Also disclosed is a composite electrolyte structure, and methods of making and using the composition and the composite electrolyte structure.

18 Claims, 5 Drawing Sheets

(51) Int. Cl.

| | |
|---|---|
| *H01M 4/90* | (2006.01) |
| *H01M 4/40* | (2006.01) |
| *H01M 12/08* | (2006.01) |
| *H01M 8/08* | (2016.01) |
| *H01M 4/38* | (2006.01) |
| *H01M 4/525* | (2010.01) |
| *C04B 35/486* | (2006.01) |
| *H01M 10/0585* | (2010.01) |

(52) U.S. Cl.
CPC ............ *C04B 2235/5481* (2013.01); *C04B 2235/764* (2013.01); *H01M 10/0585* (2013.01); *H01M 2300/0002* (2013.01); *H01M 2300/0071* (2013.01)

(56) References Cited

U.S. PATENT DOCUMENTS

| | | | |
|---|---|---|---|
| 8,828,574 B2 | 9/2014 | Visco et al. | |
| 8,828,580 B2 | 9/2014 | Visco et al. | |
| 2013/0323541 A1* | 12/2013 | Mizuno | H01M 4/8828 429/10 |
| 2014/0170465 A1* | 6/2014 | Visco | H05K 999/99 429/144 |
| 2014/0287305 A1 | 9/2014 | Wachsman et al. | |

OTHER PUBLICATIONS

Knauth, "Inorganic solid Li ion conductors: An overview" Solid State Ionics 180 (2009) 911-916.

Cheng et al., "The origin of high electrolyte-electrode interfacial resistances in lithium cells containing garnet type solid electrolytes", Phys. Chem. Chem. Phys., 2014, 16, 18294-18300.

Boulant et al., "Reaction mechanisms of $Li_{0.30}La_{0.57}TiO_3$ powder with ambient air: $H^+/Li^+$ exchange with water and $Li_2CO_3$ formation", Dalton Trans., 2010, 39, 3968-3975.

Jaunsen, "The Behavior and Capabilities of Lithium Hydroxide Carbon Dioxide Scrubbers in a Deep Sea Environment", US Naval Academy Technical Report USNA-TSPR-157, 1989.

Ma et al., "Excellent Stability of a Lithium-Ion-Conducting Solid Electrolyte upon Reversible $Li^+/H^+$ Exchange in Aqueous Solutions", Angew, Chem. Int. Ed., 2014, 53, 1-6.

Visco et al., "Lithium-Air", Encyclopedia of electrochemical power sources, Secondary Batteries—Metal-Air Systems | Lithium-Air, 2009, pp. 376-384.

Hartmann et al., "Degradation of NASICON-Type Materials in Contact with Lithium Metal: Formation of Mixed Conducting Interphases (MCI) on Solid Electrolytes", J. Phys. Chem. C, 2013, 117, 21064-21074.

Katoh et al., "Lithium/water battery with lithium ion conducting glass-ceramics electrolyte", Journal of Power Sources 196, (2011), 6877-6880.

Hou et al., Macroporous $LiFePO_4$ as a cathode for an aqueous rechargeable lithium battery of high energy density, J. Mater. Chem. A, 2013, 1, 14713-14718.

Galven et al., "Instability of Lithium Garnets against Moisture. Structural Characterization and Dynamics of $Li_{7-x}H_xLa_3Sn_2O_{12}$ and $Li_{5-x}H_xLa_3Nb_2O_{12}$", Chem. Mater. 2012, 24, 3335-3345.

Jin et al., "$Li_7La_3Zr_2O_{12}$ electrolyte stability in air and fabrication of a $Li/Li_7La_3Zr_2O_{12}/Cu_{0.1}V_2O_5$ solid-state battery", Journal of Power Sources, 239, (2013), 326-331.

Reinacher et al., "Preparation and electrical properties of garnet-type $Li_6BaLa_2Ta_2O_{12}$ lithium solid electrolyte thin films prepared by pulsed laser deposition", Solid State Ionics, 258, (2014),1-7.

Galven et al., "Structural characterization of a new acentric protonated garnet: $Li_{6-x}B_xCaLa_2Nb_2O_{12}$", J. Mater. Res., vol. 28, No. 16, 2013, pp. 2147-2153.

International Search Report, issued in connection with corresponding PCT application No. PCT/US2015/061777, dated Feb. 16, 2016.

* cited by examiner

STABILIZED SOLID GARNET ELECTROLYTE AND METHODS THEREOF

This application claims the benefit of priority under 35 U.S.C. § 119 of U.S. Provisional Application Ser. No. 62/084,907 filed on Nov. 26, 2014 the content of which is relied upon and incorporated herein by reference in its entirety.

The entire disclosure of any publication or patent document mentioned herein is incorporated by reference.

BACKGROUND

The disclosure relates to a solid garnet electrolyte article and to methods of making and using the solid garnet electrolyte article in an energy storage device.

SUMMARY

In embodiments, the disclosure provides a solid garnet electrolyte article and to methods of making and using the solid garnet electrolyte article in an energy storage device.

BRIEF DESCRIPTION OF DRAWINGS

In embodiments of the disclosure.

DETAILED DESCRIPTION

Figure 1:
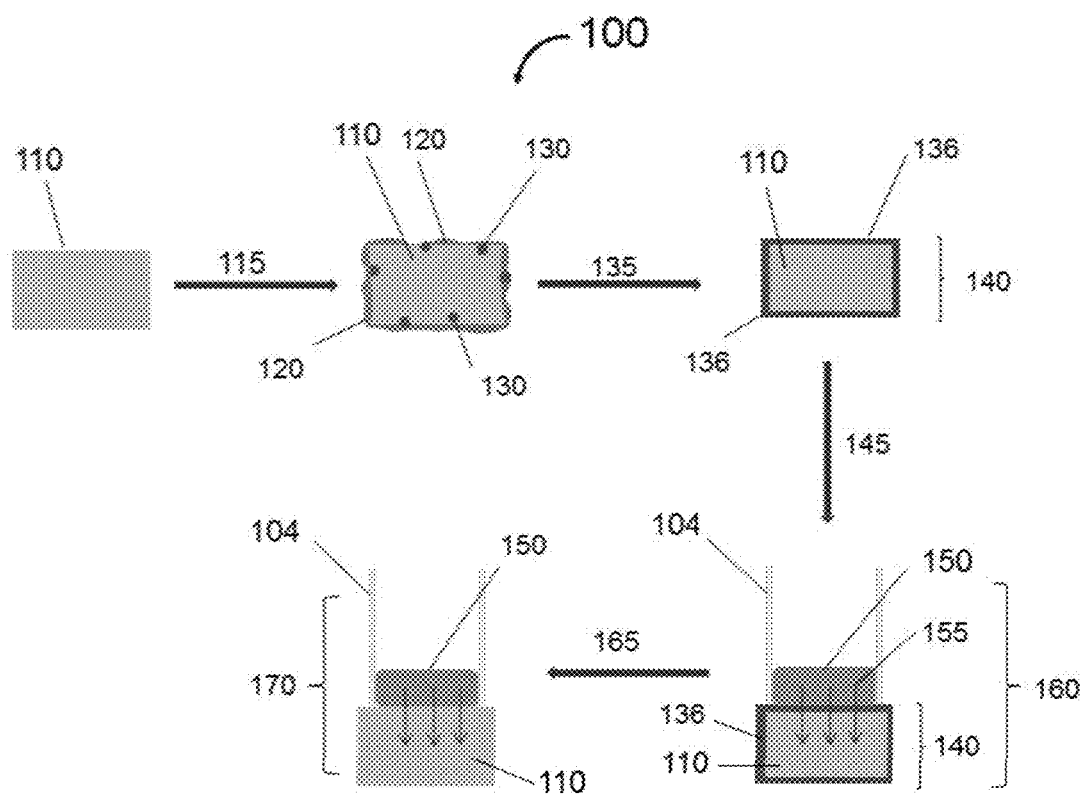
FIG. 1 is a schematic showing applicable acid treatment and regeneration steps.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Air," "ambient air," "ambient atmosphere," "atmospheric air", or like terms refers to chemical constituents occurring in earth's atmosphere, for example, dry air contains 78.09% nitrogen, 20.95% oxygen, 0.93% argon, 0.039% carbon dioxide, and small amounts of other gases. Humid air also includes water vapor.

"Compositionally stable," or like terms refers to the disclosed solid garnet composition, which composition once formed does not significantly change its composition, for example, when exposed to ambient atmosphere for several hrs or more.

"Air stable," or like terms also refers to the disclosed solid garnet composition, which composition once does not significantly change its composition, for example, when exposed to air or ambient atmosphere for several hrs or more.

"Insensitive to carbon dioxide," or like terms or phrases also refers to the disclosed solid garnet composition, which composition once formed does not significantly change its composition, for example, when exposed to air or ambient atmosphere containing carbon dioxide for several hrs or more.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

As ceramic lithium electrolytes have shown practical conductivities in excess of $10^{-4}$ S/cm are now well known (see Knauth, Solid State Ionics (2009) 180, 911-916), there is an interest in other ceramic Li-ion electrolytes that can enable high energy cell structures. The new designs rely on the ceramic electrolyte to separate incompatible anode and cathode chemistries through hermetic isolation. For example, a new approach to lithium-sulfur cell chemistry combines an aqueous sulfur cathode with a lithium metal anode (see Visco, et al., U.S. Pat. No. 8,828,574).

To enable a Li-metal anode, the ceramic electrolyte must be stable against lithium metal contact. Presently, garnet phase electrolytes such as $Li_7La_3Zr_2O_{12}$ (LLZO) have demonstrated both high lithium-ion conductivity (greater than $10^{-4}$ S/cm) and stability against Li-metal contact (Weppner, et. al., U.S. Pat. No. 8,658,317). Unfortunately, garnet materials are susceptible to forming an insulating film of lithium carbonate on exposure to ambient conditions (see Cheng, et. al., Phys. Chem. Chem. Phys., (2014) 16, 18294-18300). This insulating film can dominate the impedance of a cell if it is not removed. Cheng, et. al., suggest polishing under inert atmosphere as a solution to removal of the insulating $Li_2CO_3$ film. However, after polishing, the garnet material must be protected from further ambient exposure, or the lithium carbonate insulating film will form again. An ability to render the garnet electrolyte structures insensitive to ambient carbon dioxide to permit ambient processing is desirable.

It is known that garnet materials can reversibly undergo $H^+/Li^+$ exchange in aqueous solutions (see Ma, C., et al., (2014), Excellent Stability of a Lithium-Ion-Conducting Solid Electrolyte upon Reversible $Li^+/H^+$ Exchange in Aqueous Solutions. Angew. Chem. DOI: 10.1002/ange.201408124). When an as-synthesized garnet material is immersed in neutral water, the pH of the aqueous phase shifts towards a basic pH due to formation of LiOH, e.g., a $Li_7La_3Zr_2O_{12}$ (LLZO) garnet according to the equation:

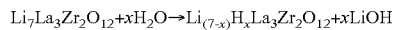
$$Li_7La_3Zr_2O_{12}+xH_2O \rightarrow Li_{(7-x)}H_xLa_3Zr_2O_{12}+xLiOH$$

This same reaction occurs at the surface of a garnet material handled in ambient air. It is known that LiOH getters or absorbs atmospheric $CO_2$ to form $Li_2CO_3$ (see Jaunsen, J. R. (1989) "The Behavior and Capabilities of Lithium Hydroxide Carbon Dioxide Scrubbers in a Deep Sea Environment," *US Naval Academy Technical Report*, USNA-TSPR-157.).

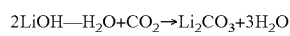
$$2LiOH-H_2O+CO_2 \rightarrow Li_2CO_3+3H_2O$$

or

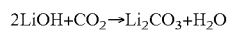
$$2LiOH+CO_2 \rightarrow Li_2CO_3+H_2O$$

The end product of the reaction sequence is an insulating surface film of lithium carbonate ($Li_2CO_3$). A similar reaction sequence was also observed for a $LiLaTiO_3$ electrolyte (see Boulant, et. al., Dalton Trans. (2010) 39 3968-3975).

Since the $H^+/Li^+$ exchange is reversible, it is possible to treat the garnet material in acid to neutralize the surface of the garnet material and decompose the formed $Li_2CO_3$. For example, $Li_2CO_3$ can be decomposed with HCl:

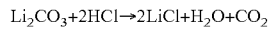
$$Li_2CO_3+2HCl \rightarrow 2LiCl+H_2O+CO_2$$

In embodiments, the disclosed method can effectively clean the garnet surface of, for example, LiOH, $Li_2CO_3$, and like species. The disclosed method can also effectively regenerate a lithium ion active garnet surface for use, for example, in an energy storage article.

In embodiments, the disclosure provides a solid garnet electrolyte article and to methods of making and using the solid garnet electrolyte article in an energy storage device.

In embodiments, the disclosure provides an air stabilized solid garnet composition and a solid electrolyte article thereof, and the disclosure provides methods of making and using the composition and the stabilized solid garnet electrolyte article.

In embodiments, the disclosure provides a method for passivating a solid lithium garnet electrolyte against surface fouling by ambient atmosphere.

In embodiments, the disclosure provides a method for treating a solid lithium garnet electrolyte, which treatment method permits ambient handling or processing of the garnet electrolyte.

In embodiments, the disclosure provides a method for regenerating, either in situ or ex situ, a passivated solid garnet electrolyte to produce an active lithium ion surface specie suitable for use in an energy storage device. The disclosure provides an example of in situ regeneration.

In embodiments, the disclosure provides a solution treatment method of a solid garnet electrolyte that cleans $Li_2CO_3$ from the surface, which can lead to improved cell performance.

In embodiments, the disclosure provides a passivation method where a garnet membrane having lithium containing surface is converted to a garnet membrane product having a lithium-deficient surface, which product is stable to, for example, atmospheric moisture, oxygen, and carbon dioxide. In embodiments, the passivation method comprises an ion exchange of lithium ions of the garnet membrane with protons (i.e., $Li^+/H^+$ exchange). The resulting super-protonated membrane can be handled under ambient conditions without concern for carbonate film formation. The super-protonated garnet can then be electrochemically converted back to a lithium-rich garnet with a lithium-containing electrode.

The present disclosure is advantaged in several aspects, including for example: The disclosed treatment method eliminates a resistive carbonate surface layer on the garnet substrate, which eliminated resistive carbonate surface layer, and improves the performance of a cell including a garnet electrolyte.

The method of making, involving contacting the garnet electrolyte with a protic acid, can be applied to a garnet electrolyte in numerous forms, which is impractical for alternative surface treatment methods such as surface polishing. Example garnet electrolyte forms that can be treated according to the disclosed method include: a porous garnet surface (which can be useful for improving electrode contact), a thin garnet coating (e.g., less than 20 microns thick), a thin garnet membrane (e.g., less than 200 microns thick such as 150 microns, 100 microns, 50 microns, including intermediate values and ranges), and like forms.

The method of making involving acid treatment of, for example, the lithium garnet electrolyte can be accomplished with a brief exposure to the acid, for example, from 1 to 2 hrs at ambient temperature.

Since the lithium ion species in the garnet electrolyte surface are chemically neutralized by the disclosed method, the formation of lithium carbonate is at least temporarily mitigated and ambient air handling of the garnet membrane is now possible, and simplifies cell construction and lowers fabrication costs.

In embodiments, the present disclosure provides a solid garnet composition, comprising:
a bulk composition comprising a lithium garnet; and
a surface composition comprising a surface protonated garnet on at least a portion of the exterior surface of the lithium garnet, wherein the surface protonated portion of the garnet composition is compositionally stable in air and insensitive to carbon dioxide.

In embodiments, the disclosure provides a solid garnet composition, comprising:
a bulk composition consisting of or consisting essentially of a lithium garnet; and
a surface composition consisting of or consisting essentially of a surface protonated garnet on at least a portion of the exterior surface of the lithium garnet, wherein the surface protonated solid garnet composition is compositionally stable in air and insensitive to carbon dioxide.

In embodiments, the bulk lithium garnet can be, for example, of the formula $Li_7La_3Zr_2O_{12}$ (LLZO) and the surface protonated garnet can be, for example, of the formula $Li_{(7-x)}H_xLa_3Zr_2O_{12}$, where x is from 0.1 to 6.75.

In embodiments, the bulk lithium garnet can be, for example, of the formula $Li_{6.75}La_{2.9}Ga_{0.1}Nb_{0.25}Zr_{1.75}O_{12}$ and the surface protonated garnet can be, for example, of the formula $Li_{(6.75-x)}H_xLa_{2.9}Ga_{0.1}Nb_{0.25}Zr_{1.75}O_{12}$, where x is from 0.1 to 6.75.

In embodiments, the surface protonated garnet can be, for example, formed on opposite sides or faces of the acid treated solid garnet composition such as the large faces or small faces the treated membrane. The non-acid treated surfaces can be, for example, protected with a mask layer. In embodiments, the surface protonated garnet can be, for example, formed on the entire outer surface of the bulk lithium garnet.

In embodiments, the disclosed solid garnet composition can be, for example, a doped LLZO, for example, of the general formula $Li_{7-z}La_{3-y}Ga_yZr_{2-z}Nb_zO_{12}$ or of the more specific formula $Li_{6.75}La_{2.9}Ga_{0.1}Zr_{1.75}Nb_{0.25}O_{12}$, having a surface composition, for example, of the formula of $Li_{(6.75-x)}H_xLa_{2.9}Ga_{0.1}Zr_{1.75}Nb_{0.25}O_{12}$, or a compound of the formula, $Li_{(7-z-x)}H_xLa_{3-y}Ga_yZr_{2-z}Nb_zO_{12}$, or a combination thereof, where x is from 0.1 to 7, y is from 0.1 to 0.3, and z is from 0.1 to 0.3.

Garnet pellet is one example of a suitable garnet. The disclosed compositions, and methods of making and use, are suitable for all garnet membranes irrespective of the method of making the bulk garnet so long as the garnet is exposed to ambient atmospheric conditions, including, for example, water, carbon dioxide, or like entities, since the garnet, unless processed in accordance with the present disclosure will form a non-protonic passive layer.

In embodiments, the protonated garnet on at least a portion of the exterior surface of the lithium garnet includes, for example, the entire exterior surface of the lithium garnet.

In embodiments, the protonated garnet on at least a portion of the exterior surface of the lithium garnet includes, for example, a layer having a thickness of from 0.1 to 100 nm.

In embodiments, the surface composition has a lithium concentration of from 0.1 to 46 mol %.

In embodiments, the surface composition can be, for example, substantially free of an electrically insulating Li surface species, for example, from 0 to less than from 10 mol %.

In embodiments, the surface composition comprises a surface free of at least one of LiOH, $Li_2CO_3$, or a combination thereof.

In embodiments, the disclosure provides a composite electrolyte structure, comprising:
a protected anode structure comprising:
  a first layer comprising a solid ceramic garnet electrolyte composition comprising a solid garnet composition, comprising:
    a bulk composition comprising a lithium garnet; and
    a surface composition comprising a protonated garnet on at least a portion of the exterior surface of the lithium garnet, wherein the solid garnet composition is compositionally stable in air and insensitive to carbon dioxide;
  a second layer comprising a source of lithium metal, wherein the first layer and the second layer are in physical contact, and contained within the protected anode structure; and
a cathode.

In embodiments, the composite electrolyte structure can further comprise, for example, an aqueous catholyte situated between and in contact with the protected anode structure and the cathode.

In embodiments, the cathode can be, for example, a lithium cobalt oxide compound of the formula $LiCoO_2$.

In embodiments, the disclosure provides a method of making the aforementioned solid garnet solid, comprising:
contacting an air sensitive lithium containing solid garnet electrolyte with a protic acid to form a solid garnet electrolyte having a protonated surface.

In embodiments, the protonated surface solid garnet composition is compositionally stable in air and insensitive to carbon dioxide.

In embodiments, the protic acid can selected be, for example, from at least one of: a mineral acid, for example, HCl, $H_3PO_4$, $HNO_3$, $H_2SO_4$, and like acids, or mixtures thereof, an organic acid, for example, acetic acid, or like organic acids, or mixtures thereof, or a combination of mineral and organic acids.

In embodiments, the method of making can further comprise, for example, contacting the air stable and carbon dioxide insensitive solid garnet electrolyte having the protonated surface with a source of lithium ions to regenerate the air sensitive lithium containing solid garnet electrolyte.

In embodiments, the contacting with a source of lithium ions can be accomplished, for example, in a sealed cell structure, for example, treating the garnet electrolyte with a lithium ion source where the garnet electrolyte is in a sealed cell structure and not on a bare membrane.

In embodiments, the source of lithium ions can be, for example, lithium metal.

In embodiments, the disclosure provides a passivation method comprising:
ion exchanging the lithium ions on the surface of an air sensitive lithium containing solid garnet membrane with protons to form an air stable and a carbon dioxide insensitive solid garnet electrolyte having a lithium-depleted protonated surface.

Referring to the Figures, FIG. 1 is a schematic (100) showing aspects of the disclosed method. In embodiments, when a membrane (110), for example, an LLZO, is exposed to ambient atmosphere or air (115) containing, for example, carbon dioxide and water, a surface layer containing LiOH and $Li_2CO_3$ (120) and minor amounts of HLZO (130) can be formed on the exposed surface, that is, products of exposure of the LLZO to the ambient atmosphere.

In embodiments, the atmosphere exposed surface can be rehabilitated by treating the affected surface with a suitable protic acid source (135) to form a membrane (140) having a protonated surface composition (e.g., on one or more faces of the membrane, on two opposite faces of the membrane; or fully surrounding or encapsulating the LLZO (110) as shown) or, for example, comprised of an HLZO layer that can be distinguished from the original minor amounts of HLZO in that the amount of proton exchange is substantially higher than the level of HLZO formed from ambient exposure. The HLZO layer formed from acid exposure can be called "super-protonated." The super-protonated surface is less prone to further reaction with ambient moisture, which renders the surface stable against formation of a surface contamination layer (120) for a period of time exceeding several hours, permitting a substantial working time under ambient conditions.

In embodiments, a pristine membrane (110) can be treated with a suitable protic acid source (135) to directly form a membrane (140) having a protonated surface composition (136) and without the appearance of LiOH and $Li_2CO_3$ (120) surface contaminants and HLZO (130).

In embodiments, at least a portion of the surface of a pristine membrane (110), for example, an LLZO or like membrane, can be contacted or treated directly with a protic acid source (135) to form a membrane product (140) having bulk or interior composition (110), for example, an LLZO, and a protonated surface composition (136), for example, an HLZO, in the protic acid source contacted area(s). The product (140) and similarly contacted membranes are stabilized solid garnet electrolyte materials that can be further processed or handled in ambient atmosphere to make or assemble (145) (e.g., cell assembly) articles or devices that include the surface protonated garnet electrolyte product (140).

In embodiments, an assembled cell (160) can include, for example, the above mentioned surface protonated garnet electrolyte product (140), a lithium metal source (150), and a glass tube or glass cylinder, or like vessel or separator (104), which combination permits lithium ion flux (155) from the lithium metal source (150) to and through the adjacent protonated surface composition (136).

In embodiments, an assembled cell (160) can be cell tested (165) to measure the lithium ion flux and the longevity properties of the protonated surface composition (140). In the cell test, the protonated surface composition (140), e.g., the HLZO surface layer(s) composition is(are) substantially converted back into, i.e., regenerates, the original lithiated surface composition (110), or nearly so, on the LLZO bulk composition, which is in contact with a lithium ion source (150), or other like original composition, by the continuing $Li^+$ flux from the Li metal during the test (170) according to the reaction, for example:

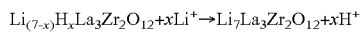

$$Li_{(7-x)}H_xLa_3Zr_2O_{12} + xLi^+ \rightarrow Li_7La_3Zr_2O_{12} + xH^+$$

This reaction does not occur in an actual device unless one contacts the protonated surface layer(s) composition with a solution having a high $Li^+$ concentration, for example, greater than about 1 M $Li^+$. However, such contact would regenerate the unstable LLZO or like garnet composition if accomplished in an ambient environment.

EXAMPLES

The following Example(s) demonstrate making, use, and analysis of the disclosed article in accordance with the above general procedures.

Example 1

Fabrication of a Sintered Garnet Membrane

Gallium and niobium bi-doped compositions having a general stoichiometric formula of:

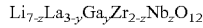

$$Li_{7-z}La_{3-y}Ga_yZr_{2-z}Nb_zO_{12}$$

where z is from 0.1 to 0.3, and y is from 0.1 to 0.3, was synthesized as follows.

A suitable starting garnet powder was made from oxide precursors, such as $Li_2CO_3$, LiOH, $La_2O_3$, $ZrO_2$, $Ga_2O_3$, $Nb_2O_5$, $Al_2O_3$, AlOOH, and like components. The powders are thoroughly dry mixed with, for example, turbulent mixing for 30 to 60 min with $ZrO_2$ media, and wet mixed, for example, in a liquid carrier such as isopropanol (IPA) or de-ionized water. The starting components are first combined using a vibratory mixer for 1 to 2 hrs until the mixed components de-agglomerate. The batch was then ball milled for about 1 to 2 hrs for further mixing. To avoid significant interaction between the liquid carrier and precursor components, a preferred total mixing time was, for example, less than 6 hrs. Then, the resulting slurry was dried at 100° C. for 1 to 2 days. The dried powder was then ready for calcination. The calcination temperature depends on the composition. Low temperature compositions can be dried at, for example, 1000° C. to 1100° C., whereas high temperature compositions can be up to 1200° C. The dried powder was calcined at 1100° C. for 6 hrs to form a garnet structure having a cubic lithium garnet phase larger than 90%. The powder was then placed in a platinum crucible with a refractory sheet cover such as pure alumina.

The garnet powder was then pressed without any addition to form dry thick pellets. The thick pellet was sintered in air with platinum protection to minimize the contact with air. The gallium and niobium bi-doped lithium garnet has a low sintering temperature from 1000° C. to 1200° C. depending on the doping levels, for example, each of gallium and niobium in the stoichiometric range of 0.1 to 0.5. A thin slice (or membrane) was cut from the pellet having a diameter of 27 mm and a thickness of 0.5 mm. The cut membranes are the specimens that were used in the cell test (see Example 3 below). An example of these compositions is $Li_{6.75}La_{2.9}Ga_{0.1}Nb_{0.25}Zr_{1.75}O_{12}$, which is an example of low level gallium doping, for example, gallium in the stoichiometric range of 0.1 to 0.5.

After calcination, the powder was milled by either dry ball or dry Jet mill. Ball milling was a very fast and low cost milling process. After ball milling, the powder usually has a bi-modal distribution, such as 0.5 to 0.8 microns and 6 to 8 microns, with no agglomerates. The jet milling is a high energy process, and a very fine powder can be achieved by colliding particles or using an impact liner surface (such as $ZrO_2$, alumina, tungsten, etc.). Lithium garnet calls for a $ZrO_2$ liner. After jet milling, the powder usually has a mono-modal distribution with a D50 around 0.5 to 0.8 microns. However, the jet milled powder tends to form some agglomerates, and storage may require a sealed condition.

A garnet cylindrical solid can be made by dry pressing. It is preferred that the powder has no agglomerates, so de-agglomeration may be necessary. First the powder was uniformly placed in the die and was then tapped. Tapping was called for because it ensures that the powder naturally compacts. A vacuum die was then used to remove any large voids. Tapping usually takes 1 to 5 mins to ensure complete compaction, and then pressed at a force at least 13,000 lbs, or greater than 7000 psi for 2 to 4 mins.

Optimal sintering condition can depend on the composition. For disclosed compositions, the sintering temperature can be, for example, from 1100° C. to 1180° C. for 2 to 15 hrs. This higher temperature and long holding time can significantly enhance the degree of sintering, although it is less economical and could cause grain growth. A preferred sintering condition was at a higher temperature but having a shorter holding time, or at a lower temperature but having a prolonged holding time. A typical sintering condition was 1120° C. for 6 hrs for one composition, and 1180° C. for 10 hrs for another composition. After sintering, the geometric density was measured to ensure the density was greater than 4.5 g/cc.

The cylindrical solid of lithium garnet was mechanically cut into a thin disk using a precision diamond blade wet saw. It was observed that disk quality improves with a mineral oil cutting medium and a high cutting speed. The finished disk thickness was from 0.4 to 0.8 mm and has a 0.040 mm thickness variation across the disk. Further dry polishing is possible to achieve a thinner disk. Thin membranes are then cut to 27 mm in diameter by laser cutting for discharge testing of the cell, and to provide samples for ion conductivity.

In this example, the lithium garnet composition was of the formula $Li_{6.75}La_{2.9}Ga_{0.1}Zr_{1.75}Nb_{0.25}O_{12}$ having bi-doping. The powder was milled by ball milling, and can have a bi-modal particle size distribution where the smaller size was around 0.6 to 0.7 microns, and the larger size was around 7 to 8 microns. A bi-modal distribution was favorable for particle compaction during tapping.

The quantitative height results of the cylindrical solids range from 12 mm (60 g) to 22 mm (80 g) after sintering. The diameter of the die was 1.5" (or 38.1 mm) and samples were explored at different sintering conditions for optimizing density and shrinkage under various conditions. An optimum sintering condition was about 1170 to 1180° C. for 6 to 15 hrs. A number of membranes, 0.5 mm thick, have been cut from these solids by diamond sawing. The quality of the slice can depend on the green quality. Defects due to imperfect packing will be reflected during the sintering process as point or line defects. Quality, thin membranes having flat, strong, hermetic and uniform thicknesses, can be achieved using the above mentioned preparative method. The ion conductivity of this composition was about 3 to $4\times10^{-4}$ S/cm.

Example 2

Garnet Thin Membrane

A suitable starting garnet powder was made from oxide precursors, such as $Li_2CO_3$, LiOH, $La_2O_3$, $ZrO_2$, $Ga_2O_3$, $Nb_2O_5$, $Al_2O_3$, AlOOH, and like components. A solid state reaction can be used to form the garnet powder. The solid state reaction involves precursor mixing and calcination. This example has the composition of $Li_{6.75}La_{2.9}Ga_{0.1}Nb_{0.25}Zr_{1.75}O_{12}$, the calcination temperature was 1100° C. for 6 hrs. After calcination, the powder had cubic lithium garnet phase over 90 wt %. The garnet powder was then dry-pressed to form a solid disk with diameter of about 38 mm and height about 20 to 40 mm. The sintering temperature was 1180° C. for 15 hrs. After sintering, the sample had the density of 4.78 g/cm$^3$. The garnet solid was then mechanically cut into a thin slice (or membrane) using a precision diamond blade wet saw. The finished thickness was from 0.4 to 0.8 mm and had a 0.040 mm thickness variation across the disk. The thin membrane is flat, hermetic, and strong. The ion conductivity of the example was $3.65\times10^{-4}$ S/cm. For cell testing, the thin membranes were cut to 27 mm in diameter by laser. Further dry polishing is possible to achieve a thinner disk, such as less than 0.2 mm.

Example 3

Acid Surface Treatment of the Sintered Garnet Membrane

Extended acid treatment can result in substantial $H^+/Li^+$ exchange. The garnet surface, bulk, or both, can be "titrated" with a suitable acid to achieve a super-protonated surface or bulk composition. If the extent of exchange is sufficient, the garnet no longer behaves as a base, i.e., the aqueous pH no longer shifts to substantially basic when the protonated material is immersed in neutral water. If the garnet is sufficiently neutralized by acid, LiOH is not formed under ambient atmospheric exposure. Accordingly, the garnet no longer forms a lithium carbonate surface layer and can be freely handled in ambient conditions.

Prior to cell testing, one membrane was kept as a control, while another was acid treated in accord with the disclosed method. In the acid treatment both sides of the thin pellet were soaked in 0.01M HCl (pH 2) aqueous acid solution for 2.5 hrs, wiped dry with tissue paper, then thoroughly rinsed with ethanol, and quickly blotted dry with tissue paper in air. The control sample was only wiped with an ethanol saturated tissue paper and air dried. The soaking solution was tested after sample removal to measure the solution acidity of pH 2.

Figure 5:
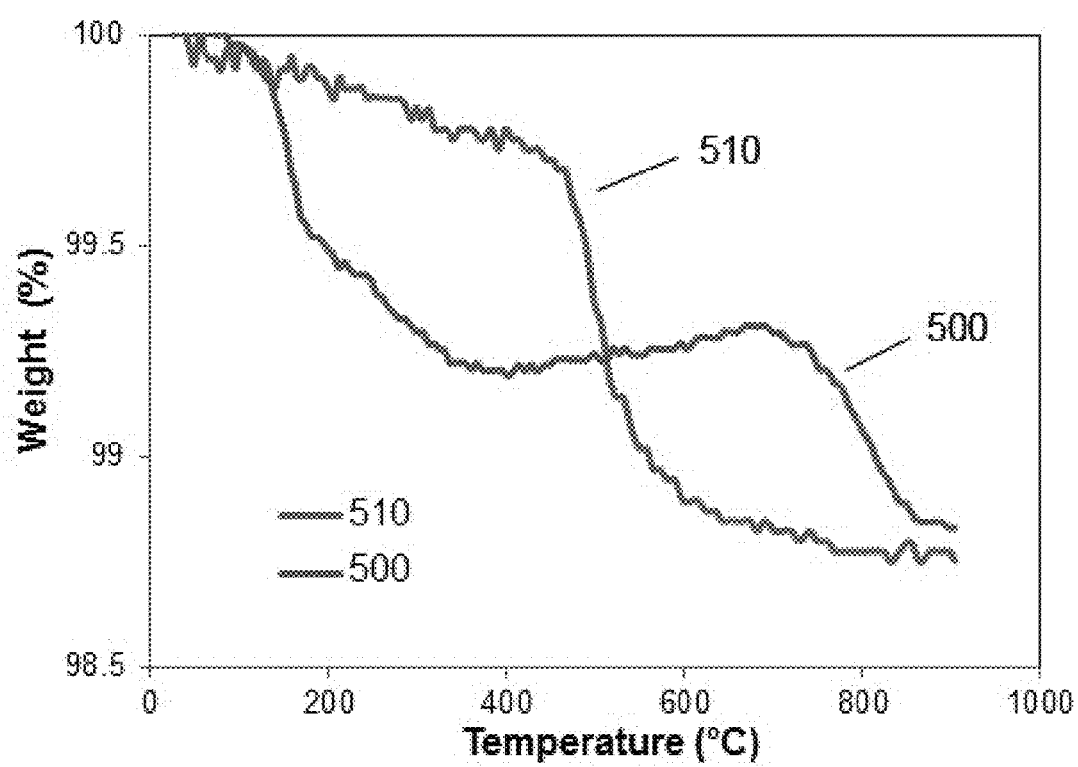
FIG. 5 shows a TGA trace comparing an acid untreated garnet control (500) sample and an acid treated garnet (510) sample after ambient moisture exposure.

FIG. 5 shows a TGA trace comparing an acid untreated garnet control (500) sample and an acid treated garnet (510) sample after ambient atmosphere and moisture exposure. The TGA conditions are 2° C./min to 900° C. hold for 2 hrs and then cool to RT under flowing air. The control sample (500) shows a two-step weight loss having one step beginning below 200° C. and another step above 700° C. The acid-soaked sample shows principally one step near 500° C. The weight loss of the control sample may be attributable to adsorbed water below 200° C., and to decomposition of lithium carbonate over 700° C. The acid soaked sample weight loss near 500° C. may be attributed to loss of water from the protonated garnet, resulting in phase decomposition. As expected no carbonate loss was found for the treated sample. The TGA data indicate the significance of avoiding high temperature treatment for the proton-exchanged garnets; even conventional drying temperatures can lead to decomposition through water loss.

Based on the weight change attributed to water loss, the nominal composition of the acid-soaked sample was $Li_5H_{1.75}La_{2.9}Ga_{0.1}Nb_{0.25}Zr_{1.75}O12$.

Example 4

Cell Testing of Treated and Untreated Garnet Membranes

Cell testing was accomplished as follows. A ceramic-electrolyte-protected lithium metal anode cell was assembled in the cell configuration shown in FIG. 2, which configuration resembles the scheme previously reported (see Visco, S. J., et al., Lithium-Air, ELC Encyclopedia of electrochemical power sources, Elsevier, 2009, 4:376-383), with the exception that no microporous polypropylene layer is present between the lithium metal anode (150) and the LLZO solid electrolyte. In the disclosed cell configuration, the lithium metal was allowed to contact the garnet pellet directly without any separator layer present in between. A mixed solution of $LiPF_6$ in ethylene carbonate (EC) and dimethyl carbonate (DMC) (EC/MDC 1/1 v/v, BASF) was used as anolyte. A mixed solution of 2M aqueous LiCl and 3M aqueous $NH_4Cl$ was used as catholyte.

Figure 2:
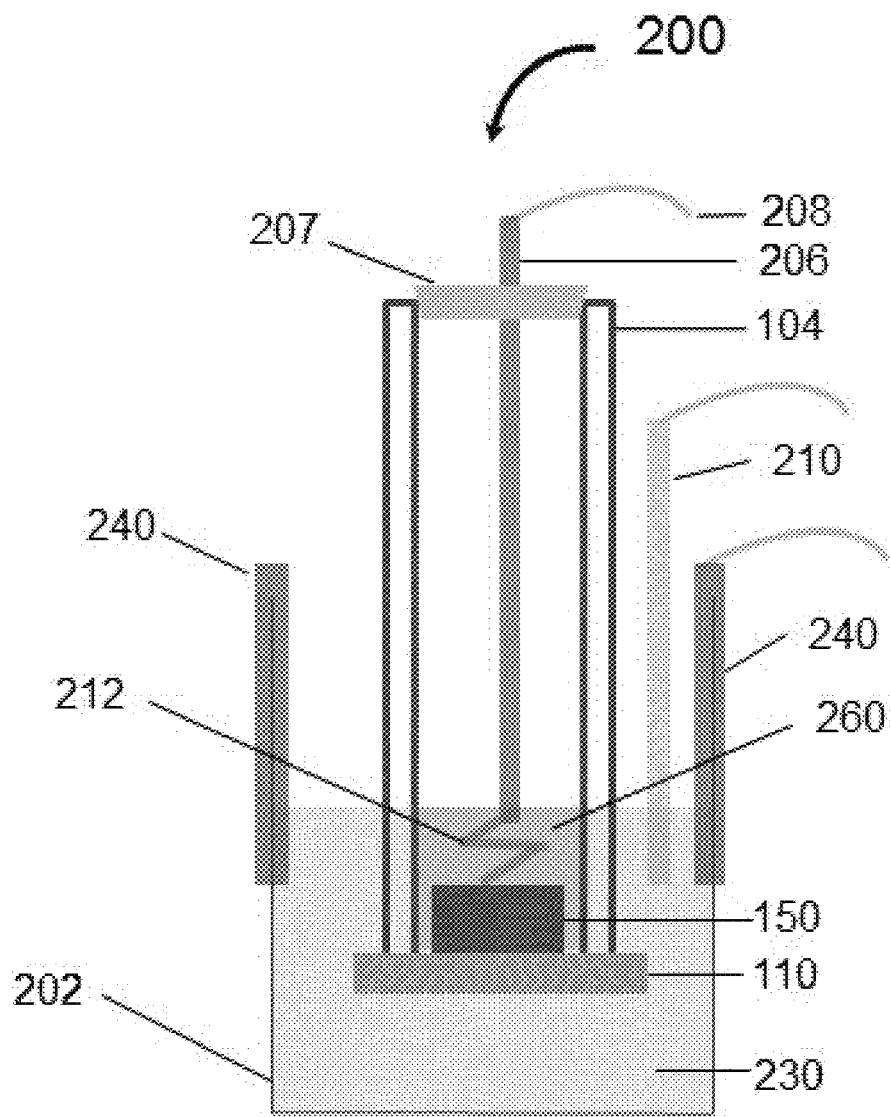
FIG. 2 is a schematic in cross section showing a test cell assembly (200) incorporating a lithium metal anode (150) in contact with a solid garnet electrolyte (110) of the disclosure.

FIG. 2 is a schematic in cross-section showing a test cell assembly (200) incorporating a lithium metal anode (150) in contact with a solid garnet electrolyte (110), the solid garnet electrolyte (110) further contacts an aqueous catholyte (230).

The test cell assembly (200) can include, for example;

a container (202) or like vessel;

a glass tube or glass cylinder, or like vessel (104) surmounting the solid garnet electrolyte (110) and further straddling the lithium metal anode (150);

a metal rod (206) traverses a seal and holder member (207) situated on the end of the glass vessel (104), and the metal rod contacts an organic anolyte (260) (such as LiPF6 in organic liquids ED/DMC; 1:1 by volume) in the interior of the glass vessel (104);

a current collector (208) is attached to the external end of the metal rod (206);

a Ni foil (212) is attached to the internal end of the metal rod (206);

the Ni foil (212) is attached to or is in electrical contact with lithium metal anode (150);

the cell is further equipped with cathodes (240) supported by, for example, the walls of the container (202), and a Ag/AgCl reference electrode (210) in contact with the aqueous catholyte (230).

Figure 3:
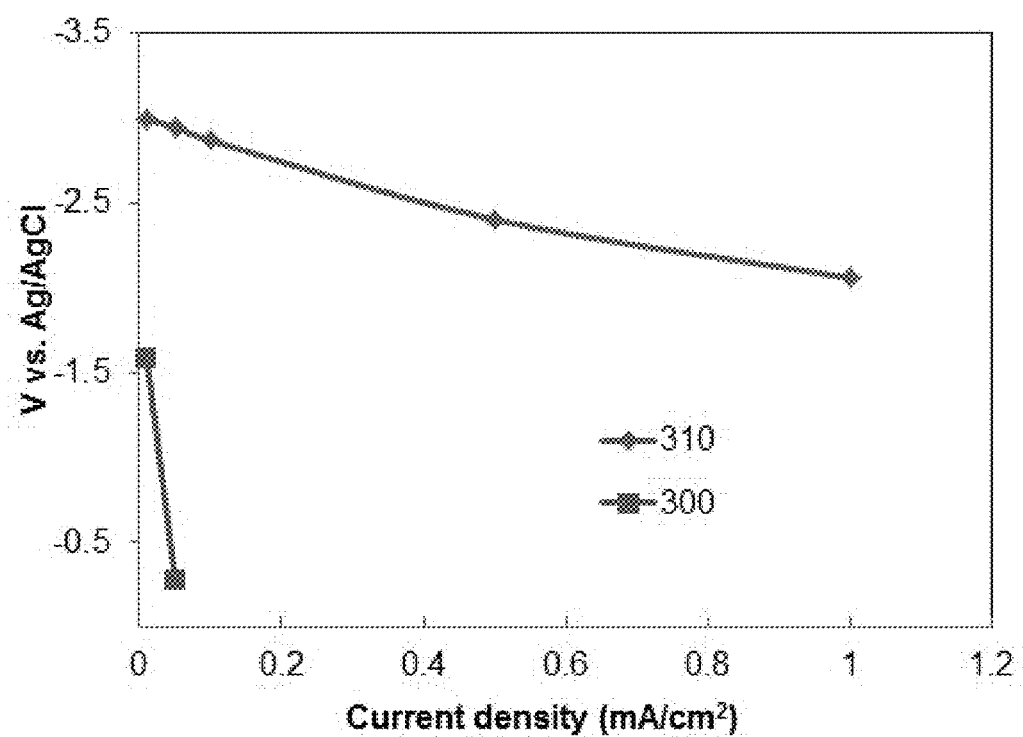
FIG. 3 compares an operating cell voltage for acid treated garnet pellets (diamonds; 310) and untreated garnet pellets (squares, 300) (control) as a function of current density.

FIG. 3 compares an operating cell voltage for acid treated garnet pellets (diamonds, 310) and untreated garnet pellets (squares, 300) (control) as a function of current density. The improved performance of the acid treated garnet sample was apparent from the data shown in FIG. 3, where the acid treated sample shows much lower polarization compared to the untreated sample. The difference in performance is attributed to the removal of the insulating lithium carbonate surface film in the acid treated sample. When the current density of control garnet cell was increased to 0.1 mA/cm$^2$, the cell over polarized immediately within 1 second. In contrast, the cell including the disclosed acid treated garnet pellet ran stably at current densities of 0.1 mA/cm$^2$, 0.5 mA/cm$^2$, and even 1.0 mA/cm$^2$.

Figure 4:
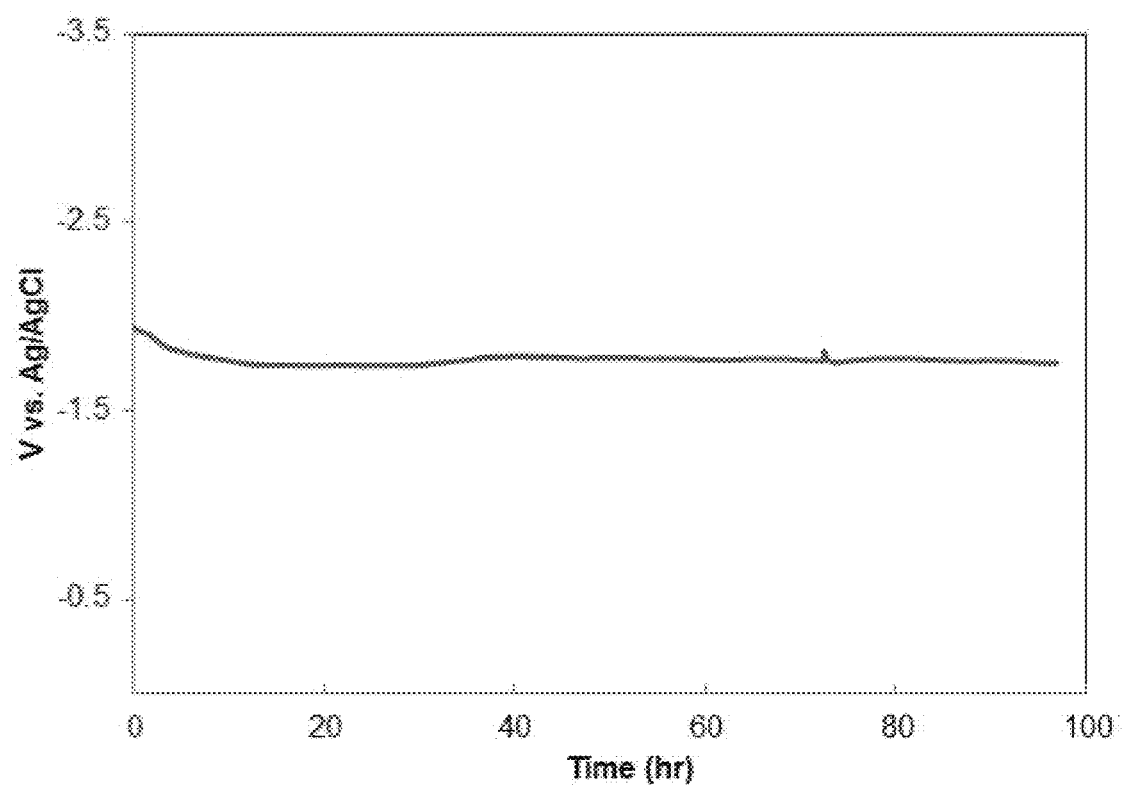
FIG. 4 shows an exemplary operating cell voltage over time for an acid treated garnet pellet at high current density of 1.0 mA/cm².

FIG. 4 shows an exemplary operating cell voltage over time for an acid treated garnet pellet at high current density of 1.0 mA/cm$^2$ for 70+ hrs such as almost 100 hrs.

The disclosure has been described with reference to various specific embodiments and techniques. However, it should be understood that many variations and modifications are possible while remaining within the scope of the disclosure.

What is claimed:

1. A solid garnet electrolyte membrane, comprising:
   a bulk composition comprising a $Li_{(7-z)}La_{(3-y)}Ga_yZr_{(2-z)}Nb_zO_{12}$ lithium garnet; and
   a surface composition comprising a $Li_{(7-z-x)}H_xLa_{(3-y)}Ga_yZr_{(2-z)}Nb_zO_{12}$ protonated garnet on at least a portion of the exterior surface of the lithium garnet, wherein the surface protonated portion of the garnet is compositionally stable in air and insensitive to carbon dioxide, and wherein x is from 0.1 to 7, y is from 0.1 to 0.3, and z is from 0.1 to 0.3.

2. The solid garnet electrolyte membrane of claim 1 wherein
   the lithium garnet is $Li_{6.75}La_{2.9}Ga_{0.1}Nb_{0.25}Zr_{1.75}O_{12}$ and the protonated garnet is $Li_{(6.75-x)}H_xLa_{2.9}Ga_{0.1}Nb_{0.25}Zr_{1.75}O_{12}$,
   where x is from 0.1 to 6.75.

3. The solid garnet electrolyte membrane of claim 1 wherein the protonated garnet on at least a portion of the exterior surface of the lithium garnet comprises the entire exterior surface of the lithium garnet.

4. The solid garnet electrolyte membrane of claim 1 wherein the protonated garnet on at least a portion of the exterior surface of the lithium garnet comprises a layer having a thickness of from 0.1 to 100 nm.

5. The solid garnet electrolyte membrane of claim 1 wherein the surface composition has a lithium concentration of from 0.1 to 46 mol %.

6. The solid garnet electrolyte membrane of claim 1 wherein the surface composition is substantially free of an electrically insulating Li surface species.

7. The solid garnet electrolyte membrane of claim 1 wherein the surface composition comprises a surface free of at least one of LiOH, $Li_2CO_3$, or a combination thereof.

8. A composite electrolyte structure, comprising:
   a protected anode structure comprising:
      a first layer comprising a ceramic electrolyte comprising the solid garnet electrolyte membrane of claim 1;
      a second layer comprising a source of lithium metal, wherein the first layer and the second layer are in physical contact; and
   a cathode.

9. The composite electrolyte structure of claim 8 further comprising an aqueous catholyte situated between and in contact with the protected anode structure and the cathode.

10. The composite electrolyte structure of claim 8 wherein the cathode is a lithium cobalt oxide compound.

11. A method of making the solid garnet composition of claim 1, comprising:
   contacting an air sensitive lithium containing garnet with a protic acid to form the solid garnet composition having a protonated garnet surface composition.

12. The method of claim 11 wherein the protic acid is selected from at least one of: a mineral acid an organic acid or a combination thereof.

13. The method of claim 11 further comprising contacting the air stable and carbon dioxide insensitive solid garnet composition having the protonated garnet surface with a source of lithium ions to regenerate the air sensitive lithium containing solid garnet.

14. The method of claim 13 wherein the contacting with a source of lithium ions is accomplished in a sealed cell structure.

15. The method of claim 13 wherein the source of lithium ions is lithium metal.

16. The solid garnet electrolyte membrane of claim 1, wherein the membrane is sintered.

17. An energy storage device comprising the solid garnet electrolyte membrane of claim 1.

18. An energy storage device comprising the composite electrolyte structure of claim 8.

* * * * *

UNITED STATES PATENT AND TRADEMARK OFFICE
CERTIFICATE OF CORRECTION

PATENT NO. : 10,211,481 B2
APPLICATION NO. : 14/934297
DATED : February 19, 2019
INVENTOR(S) : Michael Edward Badding et al.

It is certified that error appears in the above-identified patent and that said Letters Patent is hereby corrected as shown below:

On the Title Page

Item (74), Attorney, Agent, or Firm, Line 1, delete "Shanfanu" and insert -- Shantanu --, therefor.

On page 2, Column 2, item (56), other publications, Line 32, delete "Nb2012"," and insert -- Nb2O12", --, therefor.

In the Claims

In Column 12, Line 36 (approx.), Claim 12, delete "a mineral acid an organic acid" and insert -- a mineral acid, an organic acid, --, therefor.

Signed and Sealed this
Seventeenth Day of December, 2019

Andrei Iancu
*Director of the United States Patent and Trademark Office*